United States Patent [19]
Franke

[11] Patent Number: 5,706,010
[45] Date of Patent: Jan. 6, 1998

[54] METHOD AND APPARATUS FOR DETERMINING LOCATION OF AN UNKNOWN SIGNAL TRANSMITTER

[75] Inventor: Earnest A. Franke, Largo, Fla.

[73] Assignee: E-Systems, Inc., Dallas, Tex.

[21] Appl. No.: 648,905

[22] Filed: May 16, 1996

[51] Int. Cl.[6] .................... G01S 13/76; G01S 13/84
[52] U.S. Cl. .................... 342/47; 342/147; 342/193; 342/417; 342/13
[58] Field of Search ................. 342/13, 15, 147, 342/193, 194, 417, 418, 42, 47

[56] References Cited

U.S. PATENT DOCUMENTS

| | | | |
|---|---|---|---|
| 2,907,999 | 10/1959 | Wadley | 342/125 |
| 3,633,204 | 1/1972 | Earp et al. | 342/458 |
| 3,750,178 | 7/1973 | Hulst | 342/465 |
| 3,757,340 | 9/1973 | Rogoff | 342/463 |
| 3,971,019 | 7/1976 | Rymes | 342/175 |
| 4,028,625 | 6/1977 | Behrend | 455/115 |
| 4,646,092 | 2/1987 | Schreuder | 342/125 |
| 5,008,679 | 4/1991 | Effland et al. | 342/353 |
| 5,073,784 | 12/1991 | Westfall | 342/465 |
| 5,594,452 | 1/1997 | Webber et al. | 342/353 |
| 5,614,912 | 3/1997 | Mitchell | 342/146 |
| 5,648,765 | 7/1997 | Cresap et al. | 340/825.35 |
| 5,648,767 | 7/1997 | O'Connor et al. | 340/928 |

Primary Examiner—John B. Sotomayer
Attorney, Agent, or Firm—Harold E. Meier

[57] ABSTRACT

A method and apparatus determines the location of a signal transmitter located at an unknown location by using externally-induced intermodulation distortion emitted from the signal transmitter. A transmitter locator emits an interrogation signal having a frequency that is offset from the frequency of the signal emanating from the signal transmitter. The interrogation signal and the carrier signal of the signal transmitter are "mixed" within the signal transmitter to form an intermodulation product signal. The intermodulation product signal having a different frequency is then radiated from the unknown signal transmitter. A receiver tuned to the frequency of the intermodulation signal detects the returned signal and a processor determines the range and direction from the transmitter locator to the location of the signal transmitter.

18 Claims, 3 Drawing Sheets

METHOD AND APPARATUS FOR DETERMINING LOCATION OF AN UNKNOWN SIGNAL TRANSMITTER

TECHNICAL FIELD

The present invention relates to an apparatus and method for locating a signal transmitter and, in particular, to an apparatus and method for determining the location of a signal transmitter at an unknown location using a single signal receiver.

BACKGROUND OF THE INVENTION

Locating the position of a signal transmitter located at an unknown location is important for military purposes, as well as for commercial purposes. The most common method for locating a signal transmitter positioned at an unknown location is to use triangulation. Triangulation requires the use of two signal receivers with one receiver positioned at a first location and the other receiver positioned at a second location. Both receivers receive the "true" or desired signal emitted from the signal transmitter at the unknown location and triangulate the position of the source of the signal. The problem with the triangulation technique is that it requires two receivers each positioned at a different location. Further, it requires a communication channel between the two receivers in order for the triangulation to determine the unknown location of the signal transmitter.

Accordingly, there exists a need for a transmitter locator that uses externally-induced intermodulation distortion emitted from the unknown transmitter to determine the location of the unknown transmitter. Further, there is needed a transmitter locator positioned at a single point, that uses only one receiving unit. Additionally, there exists a need for a transmitter locator that uses the inherent intermodulation performance (an imperfection) of the power amplifier of a signal transmitter at an unknown location to produce an intermodulation return signal to obtain ranging information.

SUMMARY OF THE INVENTION

According to the present invention, there is provided a transmitter locator and method for determining the location of an unknown transmitter emitting a signal from an unknown location. The transmitter locator includes a transmitter for generating and emitting an interrogation signal to be received by an unknown transmitter emitting a signal from an unknown location. The interrogation signal is offset in frequency from the frequency of the signal emitted from the unknown transmitter A receiver receives an intermodulation return signal emitted from the unknown transmitter in response to the reception by the unknown transmitter of the interrogation signal. A processor connected to the receiver determines from the received intermodulation return signal a distance from the transmitter locator to the unknown transmitter.

DESCRIPTION OF THE DRAWINGS

For a more complete understanding of the present invention and the advantages thereof, reference is made to the following detailed description taken in conjunction with the accompanying drawings wherein.

DETAILED DESCRIPTION

Figure 1:
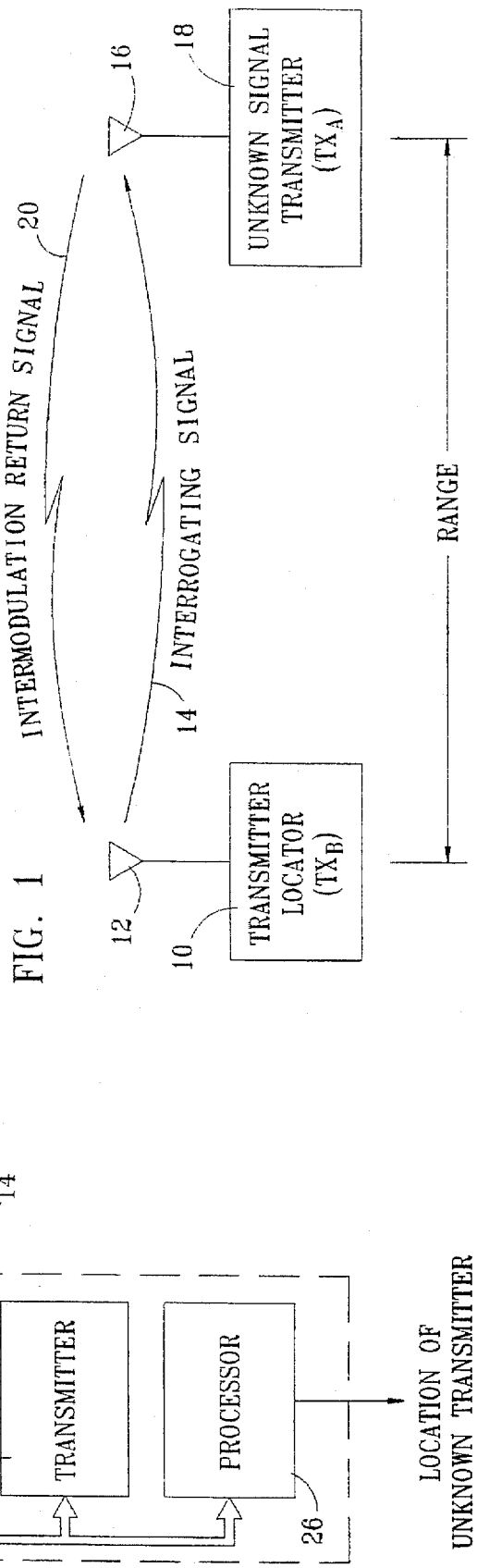
FIG. 1 illustrates an overall representation of the transmitter locating scheme in accordance with the present invention.

With reference to the drawings, like reference characters designate like or similar parts throughout the drawings.

With reference to FIG. 1, there is shown a transmitter locator 10 in accordance with the present invention. The transmitter locator 10 generates and emits an interrogation signal 14 from an antenna 12. Signal transmitter 18 positioned at an unknown location receives the interrogation signal 14 through an antenna 16. The interrogation signal 14 received by the antenna 16 is processed in the signal transmitter 18 to be mixed with a desired transmitted signal as it is emitted from the signal transmitter 18. The mixing of the interrogation signal 14 and the output of the signal transmitter 18 generally occurs in the output amplifier stage of the signal transmitter. The mixing of these signals produces an intermodulation return signal 20 to be emitted from the signal transmitter 18. The transmitter locator 10 receives the intermodulation return signal 20 and determines the range from the transmitter locator 10 to the signal transmitter 18.

Figure 2:
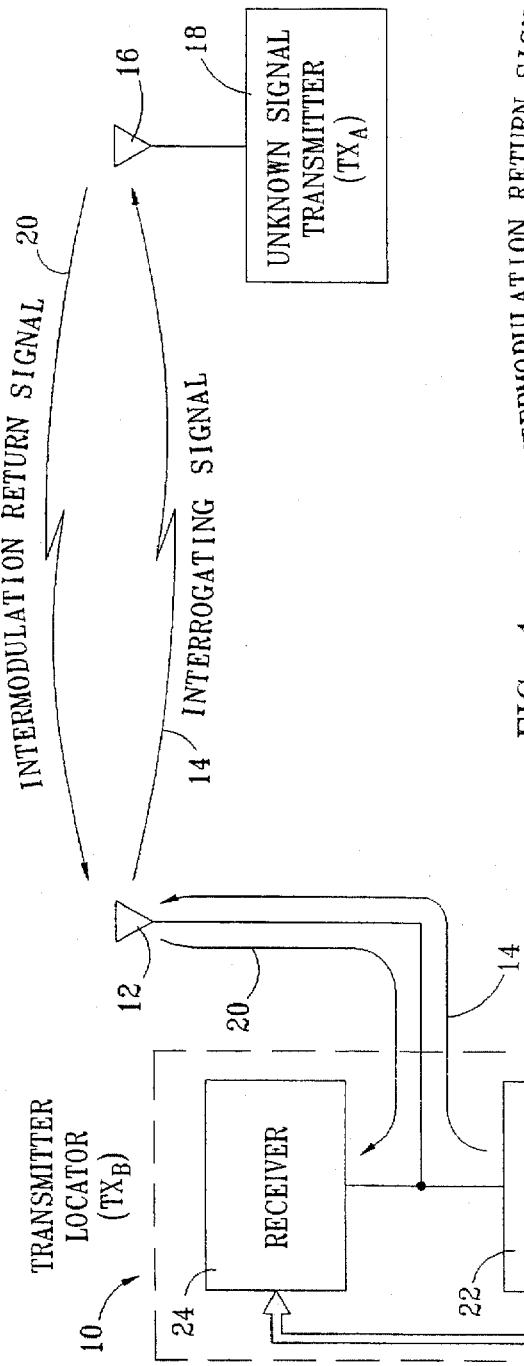
FIG. 2 is a more detailed block diagram illustrating the transmitter locator shown in FIG. 1.

Now referring to FIG. 2, there is illustrated a more detailed block diagram of the transmitter locator 10 of the present invention. The transmitter locator 10 includes a transmitter 22, a receiver 24 and a processor 26. To identify the location of the signal transmitter 18, the relative bearing and range must be determined. Typically, the signal transmitter 18 emits a signal having a particular frequency. This signal is received and locked onto by the receiver 24 of the transmitter locator 10. The signal received at the antenna 12 is processed to determine the bearing (direction) of the signal transmitter 18 with respect to the transmitter locator 10 using beamforming techniques and/or angle of arrival-techniques. It will be understood by a person skilled in the art that various beamforming techniques and/or angle of arrival techniques can be used.

Knowing the frequency of the signal emitted from the signal transmitter 18, the transmitter 22 of the transmitter locator 10 generates and emits the interrogation signal 14. The interrogation signal 14 is offset in frequency from the desired signal emitted from the signal transmitter 18. In the preferred embodiment, the interrogation signal 14 is a short pulsed signal, similar to a radar pulse. Alternatively, a spread spectrum signal may be used that includes different frequencies within the pulse, or a signal may be used that includes pulses each having different frequencies.

While the signal transmitter 18 is generating and emitting its own signal, the interrogation signal 14 is received by the antenna 16. The signal transmitter 18 acts like a mixer and heterodynes the interrogation signal 14 with its own carrier signal. This produces an intermodulation signal (i.e. third order, fifth order, seventh order, etc.) transmitted with the desired signal of the signal transmitter 18 and emitted as the intermodulation return signal.

By knowing the frequency of the signal emitted from the signal transmitter 18 and the frequency of the interrogation signal 14, the transmitter locator 10 identifies the frequencies of the intermodulation signal emitted from the signal transmitter 18. Generally, the third-order intermodulation signals is used since this has the most energy. A processor 26 connected to the transmitter 22 and the receiver 24 measures the round-trip transit time from the transmission of the interrogation signal 14 to the reception of the intermodulation return signal 20. Distance or range to the unknown signal transmitter 18 is then calculated. Use of a spread spectrum signal could alternatively be used for a timing and clocking function.

Intermodulation (return) signals 20 are generated in a final amplifier stage 104 of the signal transmitter 18. The interrogation signal 14 radiated from the transmitter locator ($TX_B$) 10 is directed toward the antenna 16 of the signal transmitter ($TX_A$) 18 at a distant location. This results in the interrogation signal 14 entering the final amplifier stage of the signal transmitter 18. Most transmitters operate in either the Class C, D or E mode for maximum efficiency. As such, the final amplifier stage in these transmitters is non-linear and acts as a mixer. The carrier signal frequency ($F_A$) of the signal transmitter ($TX_A$) 18 mixes with the interrogating (or locating) signal ($F_B$) 14 to produce intermodulation signals ($F_{IM}$). The intermodulation signals ($F_{IM}$) are then re-radiated via the antenna 16 of the signal transmitter ($TX_A$) 18, along with the desired signal ($F_A$). These signals are received as the intermodulation return signal 20 by the receiver 24 of the transmitter locator 10 tuned to the intermodulation signal frequency ($F_{IM}$).

Figure 3:
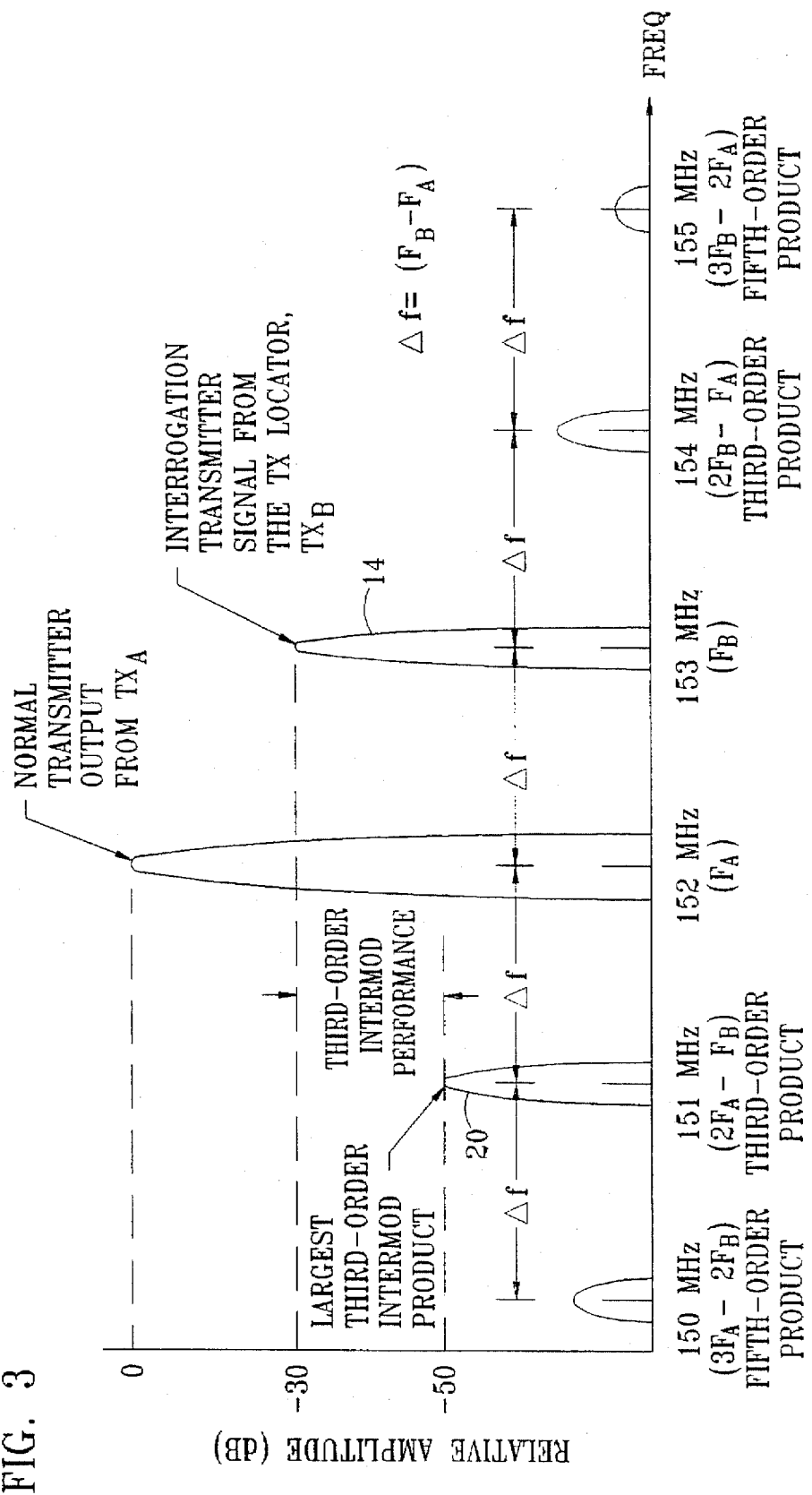
FIG. 3 illustrates the intermodulation products emitted from an unknown signal transmitter.

Externally-induced (also known as reverse-intermod or back-intermod) transmitter intermodulation distortion is caused by the mixing of frequencies in the final amplifier stage of a transmitter. New frequencies (intermod products) are generated which are then radiated from the transmitter. The creation of new spurious signals is in accordance with the simple sum and difference mixing formula:

$$F_{IM} = +/- nF_A +/- mF_B$$

where $F_{IM}$=frequency of the intermodulation signal $F_A$=frequency of the unknown signal transmitter $F_B$=frequency of the transmitter locator interrogation signal n, m=1,2,3 . . . integers If more than two frequencies are involved, the number of combinations rises rapidly. The order of the intermodulation signal is equal to the sum of the integers n plus m. The most important intermodulation signals are those that are closest to the carrier frequency with low integers, because these signals are both the strongest and the most difficult to filter. The third-order signals ($2F_A-F_B$ and $2F_B-F_A$) and the fifth order signals ($3F_A-2F_B$ and $3F_B-2F_A$) are shown in FIG. 3. The amplitude of each signal is shown relative to the output signal carrier level. The intermodulation signals are spaced at the difference frequency (Fb–Fa).

FIG. 3 illustrates the intermodulation signals for a specific example where the signal transmitter ($TX_A$) 18 is transmitting a signal having a frequency equal to 152 MHz. Accordingly, the transmitter locator ($TX_B$) 10 generates and emits an interrogation signal 14 having a frequency offset from the frequency of the signal transmitter ($TX_A$) 18. In this specific example, the frequency of the interrogation signal 14 is 153 MHz. Therefore, the delta frequency is 1 MHz. This produces two third-order intermodulation signals—one at 151 MHz and the other at 154 MHz, and two fifth-order intermodulation products—one at 150 MHz and the other at 155 MHz, and so on.

As will be appreciated, the third-order intermodulation signal is generally selected as the signal of interest to the transmitter locator ($TX_B$) 10 since it usually has the most energy.

It will be understood that the frequency of the interrogation signal 14 chosen to be emitted from the transmitter locator ($TX_B$) 10 will depend on the frequency of the signal emitted from the signal transmitter ($TX_A$) 18. Generally, the frequency of the interrogating signal 14 should be close to the frequency of the signal transmitter ($TX_B$) 18.

Figure 4:
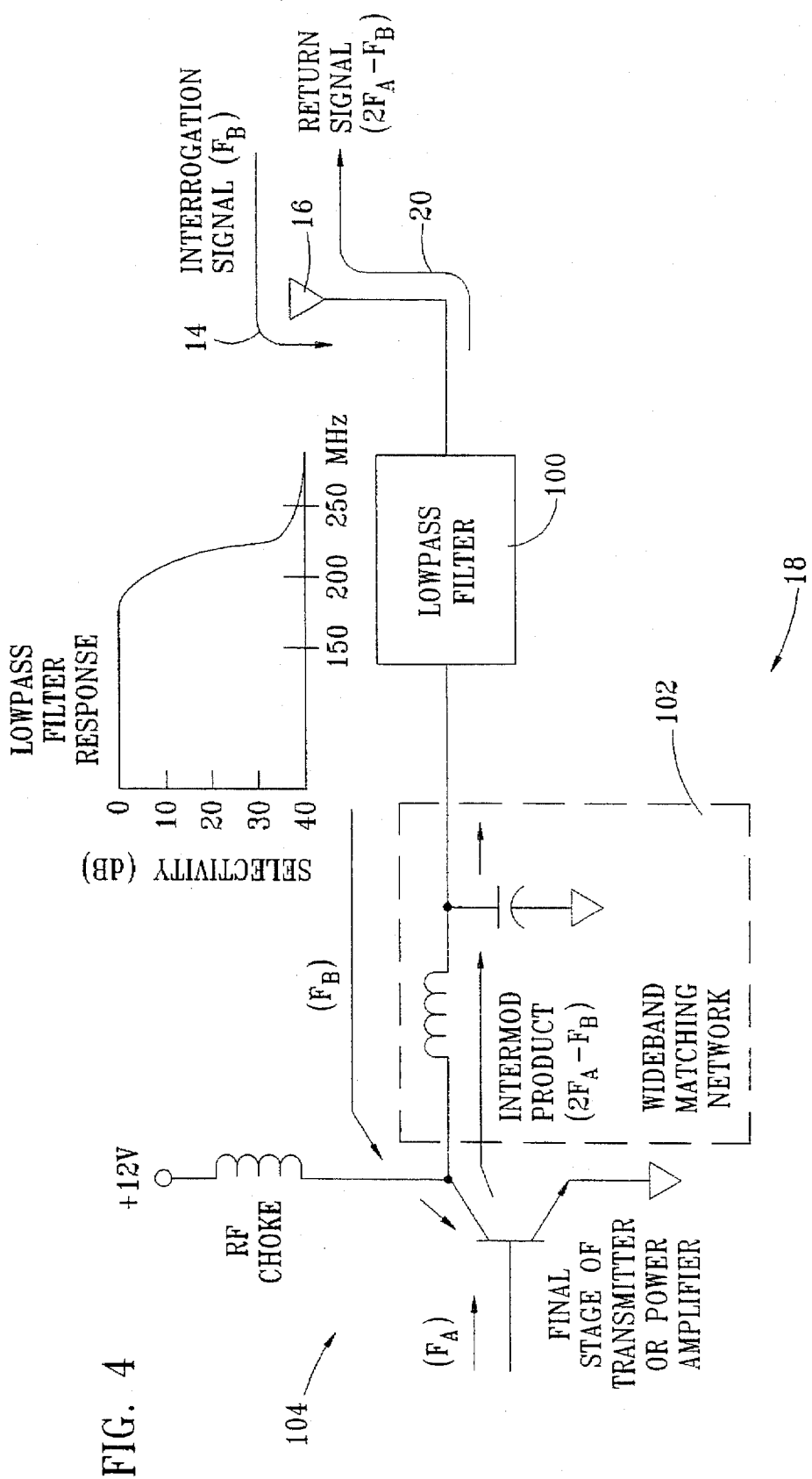
FIG. 4 illustrates a typical transmitter output circuit.

Now referring to FIG. 4, there is illustrated a typical transmitter output circuit. The interrogation signal 14 is received by the antenna 16 of the signal transmitter 18 mixes with the second harmonic of the operating frequency ($2F_A$) in the collector or drain of the final amplifier stage 104. A low pass filter 100 blocks the third-order, sum intermodulation signal ($2F_A+F_B$) output from the amplifier 104. The low pass filter 100 is normally a part of a signal transmitter 18 to filter harmonic energy (i.e., $2F_A$, $3F_A$, $4F_A$). The third-order, difference intermodulation signal ($2F_A-F_B$) from the amplifier 104 will, however, pass through the wideband matching network 102 and the low pass filter 100 and be radiated by the antenna 16. If the frequency of the interrogation signal 14 is close to the frequency of the signal transmitter 18, even a high-Q cavity filter at the output of the signal transmitter 18 will not filter the interrogation signal 14 from reaching the final amplifier stage 104.

Although one embodiment of the present invention has been described in the foregoing detailed description and illustrated in the accompanying drawings, it will be understood by those skilled in the art that the invention is not limited to the embodiments disclosed but is capable of numerous rearrangements, substitutions and modifications without departing from the spirit of the invention.

What is claimed is:

1. A transmitter locator for determining the location of a signal transmitter having an output amplifier stage transmitting a carrier signal, comprising:

a receiver having an input for receiving the carrier signal emitted by the signal transmitter;

a transmitter for generating and transmitting an interrogation signal responsive to the carrier signal and having a frequency offset from the frequency of the carrier signal, the output amplifier stage of the signal transmitter to be located receives the interrogation signal and in response thereto generates and transmits an intermodulation return signal received at the input of the receiver;

said intermodulation return signal includes a heterodyne combination of the carrier signal and the interrogation signal; and a processor connected to the transmitter and receiver for determining the location of the signal transmitter in relation to the transmitter locator.

2. The transmitter locator in accordance with claim 1 further comprising an antenna connected to the transmitter and the receiver.

3. The transmitter locator in accordance with claim 1 wherein the processor further includes means for determining the bearing of the signal transmitter in relation to the transmitter locator.

4. The transmitter locator in accordance with claim 3 wherein said means for determining the bearing further includes means for calculating the bearing utilizing the frequency of the carrier signal and either a beam forming technique or an angle of arrival technique.

5. The transmitter locator in accordance with claim 1 wherein the processor further includes means for calculating the range of the signal transmitter to that of the transmitter locator utilizing the round-trip time from the transmission of the interrogation signal until reception by the processor of the intermodulation return signal emitted by the signal transmitter.

6. The transmitter locator in accordance with claim 5 wherein the interrogation signal includes a short pulse signal, a spread spectrum signal or a signal having pulses each having a different frequency.

7. The transmitter locator in accordance with claim 1 wherein the processor further includes means for identifying the highest energy frequency of the intermodulation return signal.

8. The transmitter locator in accordance with claim 1 wherein the output amplifier stage further includes:
- a transistor for mixing the interrogation signal and the carrier signal to generate the intermodulation return signal, said transistor including a collector electrode;
- a wideband matching network having one input connected to the collector electrode of the transistor; and
- a low pass filter connected to a second input of the wideband matching network, the intermodulation return signal having an nth order component passing through the wideband matching network and the low pass filter.

9. A transmitter locator for determining the location of a signal transmitter having an unknown location, comprising:
- means for approximating a bearing of a signal transmitter to be located, said means for approximating the bearing further includes means for determining the frequency of a carrier signal generated and transmitted by the signal transmitter to be located; and
- means for approximating a range to the signal transmitter, said means for approximating the range of the signal transmitter further includes a processor for calculating the round-trip time between the transmission of an interrogation signal from the processor to reception by the processor of an intermodulation return signal emitted by the signal transmitter to be located, said intermodulation return signal comprising a heterodyne combination of the carrier signal and the interrogation signal.

10. A system for determining the location of a signal transmitter transmitting a carrier signal from an unknown location, comprising:
- a receiver having an input for receiving the carrier signal emitted by the signal transmitter;
- a transmitter connected to the receiver for generating and transmitting an interrogation signal responsive to the carrier signal, the interrogation signal having a frequency offset from the frequency of the carrier signal, to the signal transmitter to be located in response thereto the signal transmitter generates and transmits an intermodulation return signal to the input of the receiver;
- a processor connected to the transmitter and receiver and responsive to the received and transmitted signals for determining the location of the signal transmitter; and
- said signal transmitter including a nonlinear output stage for combining the carrier signal and the interrogation signal to generate the intermodulation return signal.

11. The system in accordance with claim 10 wherein the nonlinear output stage further includes:
- a transistor for mixing the interrogation signal and the carrier signal to generate the intermodulation return signal, said transistor including a collector electrode;
- a wideband matching network having one input connected to the collector electrode of the transistor; and
- a low pass filter connected to a second input of the wideband matching network, the intermodulation return signal having an nth order component passing through the wideband matching network and the low pass filter.

12. A method for determining the location of a signal transmitter in relation to a transmitter locator, where said signal transmitter transmits a carrier signal from an unknown location, comprising the steps of:
- determining a bearing of the signal transmitter in relation to the transmitter locator, said step of determining a bearing further includes the steps of:
  - receiving the carrier signal at the transmitter locator; and
  - calculating the bearing of the signal transmitter from the frequency of the carrier signal; and
- calculating a range to the signal transmitter to the transmitter locator using an intermodulation return signal comprising a heterodyne combination of the carrier signal and an interrogation signal.

13. The method in accordance with claim 12 wherein the step of calculating a range to the signal transmitter from the transmitter locator further includes the steps of:
- transmitting the interrogation signal in response to the carrier signal;
- receiving at the signal transmitter the interrogation signal having a frequency offset from the frequency of the carrier signal;
- mixing the interrogation signal with a predetermined harmonic of the carrier signal to generate and transmit the intermodulation return signal;
- receiving the intermodulation return signal; and
- calculating the range from round-trip time of the transmission of the interrogation signal from the transmitter locator to reception by the transmitter locator of the intermodulation return signal emitted by the signal transmitter.

14. The method in accordance with claim 13 wherein the step of mixing further includes the step of filtering selected harmonics of the intermodulation return signal.

15. A method for determining the location of a signal transmitter in relation to a transmitter locator, said signal transmitter transmitting a carrier signal, comprising the steps of:
- receiving the carrier signal at the transmitter locator;
- calculating the bearing of the signal transmitter utilizing the frequency of the carrier signal;
- transmitting an interrogation signal generated by the transmitter locator in response to the carrier signal, said interrogation signal having a frequency offset from the frequency of the carrier signal;
- receiving the interrogation signal at the signal transmitter;
- mixing the interrogation signal with a selected harmonic of the carrier signal in the signal transmitter to generate and transmit an intermodulation return signal;
- receiving at the transmitter locator the intermodulation return signal; and
- calculating the range of the signal transmitter from the signal locator based on the round-trip time for the transmission of the interrogation signal from the transmitter locator until reception by the transmitter locator of the intermodulation return signal emitted by the signal transmitter.

16. A transmitter locator for determining the location of a signal transmitter having a nonlinear output stage transmitting a carrier signal, comprising:
- a receiver having an input for receiving the carrier signal emitted by the signal transmitter;

a transmitter for generating and transmitting to the signal transmitter an interrogation signal responsive to the carrier signal and having a frequency offset from the frequency of the carrier signal, the nonlinear output stage of the signal transmitter to be located responds to the interrogation signal and generates and transmits an intermodulation return signal received at the input of the receiver, said intermodulation return signal comprising a heterodyne combination of the carrier signal and the interrogation signal;

said nonlinear output stage further includes:

a transistor for heterodyning the interrogation signal and the carrier signal to generate the intermodulation return signal, said transistor including a collector electrode;

a wideband matching network having one input connected to the collector electrode of the transistor; and a low pass filter connected to a second input of the wideband matching network, the intermodulation return signal having an nth order component passing through the wideband matching network and the low pass filter; and a processor connected to the transmitter and receiver for determining the location of the signal transmitterr, said processor further includes:

means for calculating the bearing utilizing the frequency of the carrier signal and either a beam forming technique or an angle of arrival technique; and means for calculating the range of the signal transmitter utilizing the round-trip time from the transmission of the interrogation signal until reception by the processor of the intermodulation return signal emitted by the signal transmitter.

17. The transmitter locator in accordance with claim 16 wherein the interrogation signal includes a short pulse signal, a spread spectrum signal or a signal having pulses each having a different frequency.

18. The transmitter locator in accordance with claim 16 wherein the processor further includes means for identifying the highest energy frequency of the intermodulation return signal.

* * * * *